United States Patent [19]
Jin et al.

[11] Patent Number: 6,055,348
[45] Date of Patent: Apr. 25, 2000

[54] TUNABLE GRATING DEVICE AND OPTICAL COMMUNICATION DEVICES AND SYSTEMS COMPRISING SAME

[75] Inventors: Sungho Jin, Millington; Hareesh Mavoori, Berkeley Heights, both of N.J.

[73] Assignee: Lucent Technologies Inc., Murray Hill, N.J.

[21] Appl. No.: 09/159,380

[22] Filed: Sep. 23, 1998

[51] Int. Cl.[7] ........................................ G02B 6/34
[52] U.S. Cl. ..................... 385/37; 359/130; 359/341; 372/20
[58] Field of Search .................. 385/12, 15, 19, 385/37, 31, 137; 359/115, 124, 130, 341; 372/6, 20

[56] References Cited

U.S. PATENT DOCUMENTS 5,841,920  11/1998  Lemaire ................................. 385/37
5,926,599  7/1999  Bookbinder et al. .................. 385/137
5,991,483  11/1999  Engelberth ............................. 385/37

*Primary Examiner*—Hemang Sanghavi

[57] ABSTRACT

A tunable optical grating device that can be digitally and latchably tuned comprises a length of waveguide including a grating region, and a movable body and fixed substrate attached to the waveguide proximal the grating region. The body is movable from a first position to at least a second position, and in some embodiments to a plurality of positions, along the length of the waveguide to apply a mechanical strain to the grating to shift the wavelength response of the device. The movable body is latchable between the various positions along the length of the waveguide to define a latchably tunable device so that a continuous supply of power is not needed to tune the device. The digitally and latchably tunable optical grating device is useful in WDM communication systems, particularly for adding or dropping channels and for dynamically gain-equalizing optical amplifiers.

25 Claims, 4 Drawing Sheets

TUNABLE GRATING DEVICE AND OPTICAL COMMUNICATION DEVICES AND SYSTEMS COMPRISING SAME

FIELD OF THE INVENTION

The present invention relates to a tunable optical grating device and to communication systems and devices using the tunable grating. In particular, it concerns devices and systems including optical fiber gratings the wavelength of which can be digitally and latchably tuned between preset values.

BACKGROUND OF THE INVENTION

Optical gratings are useful in controlling the paths or properties of traveling light. Gratings based on optical fibers are of particular interest as components in modern telecommunication systems. Basically, optical fibers are thin strands of glass capable of transmitting information-containing optical signals over long distances with low loss. In essence, an optical fiber is a small diameter waveguide comprising a core having a first index of refraction surrounded by a cladding having a second (lower) index of refraction. As long as the refractive index of the core exceeds that of the cladding, a light beam propagated along the core exhibits total internal reflection, and it is guided along the length of the core. Typical optical fibers are made of high purity silica, and various concentrations of dopants may be added to control the index of refraction.

Optical gratings are important elements for selectively controlling specific wavelengths of light transmitted within optical systems such as optical communication systems. Such gratings may include Bragg gratings, long-period gratings, and diffraction gratings. These gratings typically comprise a body of material with a plurality of spaced-apart optical grating elements disposed in the material. Often, the grating elements comprise substantially equally-spaced index perturbations, slits, or grooves. For all types of gratings, it would be highly useful to be able to reconfigure or tune the grating to selectively adjust the controlled wavelengths. As an illustration, the Bragg grating, long-period grating, and diffraction grating are discussed below.

A typical Bragg grating comprises a length of optical waveguide, such as optical fiber, in which a plurality of perturbations in the index of refraction are substantially equally-spaced along the waveguide length. These perturbations selectively reflect light of wavelength $\lambda$ equal to twice the spacing $\Lambda$ between successive perturbations times the effective refractive index. In other words, $\lambda = 2n_{eff}\Lambda$, where $\lambda$ is the vacuum wavelength and $n_{eff}$ is the effective refractive index of the propagating mode. The remaining wavelengths pass essentially unimpeded. Bragg gratings have found use in a variety of applications including filtering, adding and dropping signal channels, stabilizing semiconductor lasers, reflecting fiber amplifier pump energy, and compensating for waveguide dispersion.

Bragg gratings may be conveniently fabricated by doping a waveguide core with one or more dopants sensitive to ultraviolet light, e.g., germanium or phosphorous, and exposing the waveguide at spatially periodic intervals to a high intensity ultraviolet light source, e.g., an excimer laser. The ultraviolet light interacts with the photosensitive dopant to produce long-term perturbations in the local index of refraction. The appropriate periodic spacing of perturbations can be obtained by use of a physical mask, a phase mask, or a pair of interfering beams.

A difficulty with conventional Bragg gratings, however, is that they filter light of only a fixed wavelength. Each grating selectively reflects light in a narrow bandwidth centered around $\lambda = 2n_{eff}\Lambda$. However, in many applications, such as wavelength division multiplexing (WDM), it would be desirable to have a grating whose wavelength response can be controllably altered.

One attempt to make a tunable waveguide grating involves applying strain to the grating using a piezoelectric element. See Quetel et al., 1996 *Technical Digest Series, Conf. on Optical Fiber Communication,* San Jose, Calif., Feb. 25–Mar. 1, 1996, Vol. 2, p. 120, paper No. WF6. A difficulty with this approach is that the strain produced by piezoelectric actuation is relatively small which limits the tuning range of the device. Moreover, this approach requires that electrical power be continuously applied at relatively high voltage, e.g., approximately 100 volts. Other tunable gratings involving the application of strain to the grating are disclosed in U.S. patent application Ser. No. 08/791,081 filed by Jin et al on Jan. 29, 1997, U.S. patent application Ser. No. 09/020,206, filed by Espindola el al on Feb. 6, 1996, U.S. patent application Ser. No. 08/971,956 filed by Jin el al on Oct. 27, 1997, and U.S. patent application Ser. No. 08/971,953 filed by Fleming et al. on Oct. 27, 1997, all of which were assigned to the present assignee and are incorporated herein by reference.

Long-period fiber grating devices provide wavelength dependent loss and may be used for spectral shaping. A long-period grating couples optical power between two copropagating modes with low back reflections. A long-period grating typically comprises a length of optical waveguide wherein a plurality of refractive index perturbations are spaced along the waveguide by a periodic distance $\Lambda'$ which is large compared to the wavelength $\lambda$ of the transmitted light. In contrast with conventional Bragg gratings, long-period gratings use a periodic spacing $\Lambda'$ which is typically at least 10 times larger than the transmitted wavelength, i.e. $\Lambda' \geq 10\lambda$. Typically $\Lambda'$ is in the range 15–1500 micrometers, and the width of a perturbation is in the range $\frac{1}{5}\Lambda'$ to $\frac{4}{5}\Lambda'$. In some applications, such as chirped gratings, the spacing $\Lambda'$ can vary along the length of the grating.

Long-period fiber grating devices selectively remove light at specific wavelengths by mode conversion. In contrast with conventional Bragg gratings in which light is reflected and stays in the waveguide core, long-period gratings remove light without reflection, such as by converting it from a guided mode to a non-guided mode. A non-guided mode is a mode which is not confined to the core, but rather, is defined by the entire waveguide structure. Often, it is a cladding mode. The spacing $\Lambda'$ of the perturbations is chosen to shift transmitted light in the region of a selected peak wavelength $\lambda_p$ from a guided mode into a non-guided mode, thereby reducing in intensity a band of light centered about the peak wavelength $\lambda_p$. Alternatively, the spacing $\Lambda'$ can be chosen to shift light from one guided mode to a second guided mode (typically a higher order mode), which is substantially stripped off the fiber to provide a wavelength dependent loss. Such devices are particularly useful for equalizing amplifier gain at different wavelengths of an optical communications system.

A difficulty with conventional long-period gratings, however, is that their ability to dynamically equalize amplifier gain is limited, because they filter only a fixed wavelength acting as wavelength-dependent loss elements. Each long-period grating with a given periodicity ($\Lambda'$) selectively filters light in a narrow bandwidth centered around the peak wavelength of coupling, $\lambda_p$. This wavelength is determined by $\lambda_p = (n_g - n_{ng}) \cdot \Lambda'$, where $n_g$ and $n_{ng}$ are the effective indices of the core and the cladding modes, respectively. The value of $n_g$ depends on the core and cladding refractive indices while the value of $n_{ng}$ depends on the core, cladding and air indices.

In the future, multi-wavelength communication systems will require reconfiguration and reallocation of wavelengths among the various nodes of a network depending on user requirements, e.g., with programmable add/drop elements. This reconfiguration will impact upon the gain of the optical amplifier. As the number of channels passing through the amplifier changes, the amplifier will start showing deleterious peaks in its gain spectrum, requiring modification of the long-period grating used to flatten the amplifier. Modifying the long-period grating implies altering either the center wavelength of the transmission spectrum or the depth of the coupling.

Thus, there is a need for a long-period grating whose transmission spectra can be controlled as a function of the number of channels and power levels transmitted through an amplifier. It is desirable to have a long-period grating which, upon activation, can be made to dynamically filter other wavelengths (i.e., besides $\lambda_p$). It is also desirable to be able to selectively filter a broad range of wavelengths. Further, a tunable long period grating would be useful for suppressing amplifier spontaneous emission (ASE), and for use as a tunable loss element for filtering out undesirable remnant signals from communication channel add/drop operations.

Diffraction gratings typically comprise reflective surfaces containing a large number of parallel etched lines of substantially equal spacing. Light reflected from the grating at a given angle will have a different spectral content depending on the spacing. The spacing in conventional diffraction gratings, and hence the spectral content, is generally fixed.

As may be appreciated, those concerned with technologies involving optical communications systems continually search for new designs and methods for making tunable optical grating devices. It should be apparent from the foregoing that there remains a need for a tunable optical grating device which can include a Bragg grating, a long-period grating, or a diffraction grating that does not require a continuous application of power. For certain optical networking applications in telecommunications systems, it would be advantageous to shift the wavelength with accuracy, e.g., by about one-half or one channel width. This invention discloses such a digitally tunable (switchable) grating device and telecommunication systems comprising the inventive device.

SUMMARY OF THE INVENTION

Summarily described, the invention embraces a tunable optical grating device the wavelength of which can be latchably tuned so that a wavelength shift may be produced without use of a continuous power supply. In one embodiment, the device comprises a length of waveguide including a grating region with a plurality of spaced-apart grating elements, a movable body attached to the waveguide proximal the grating region, and a fixed substrate, also attached to the waveguide proximal the grating region. The body is movable from a first position to at least a second position, and in some embodiments to a plurality of positions, along the length of the waveguide in the area of the grating region. When the body is moved, a strain is applied to the grating so that the spacings between the grating elements are changed to shift the wavelength response of the device to provide a tunable optical grating device. The movable body is latchable between the various positions along the waveguide to define a latchably tunable device so that a continuous supply of power is not needed to tune the device. The device is especially useful in WDM communication systems, particularly for adding or dropping channels and for dynamically gain-equalizing optical amplifiers.

BRIEF DESCRIPTION OF THE DRAWINGS

The advantages, nature and additional features of the invention will appear more fully upon considering the illustrative embodiments described in the accompanying drawings. In the drawings:

FIGS. 6–9 illustrate systems or applications including the inventive tunable grating device wherein, FIG. 6 shows an N channel add/drop WDM communication system with two circulators and one or more tunable gratings;

FIG. 7 schematically illustrates a wide band tunable loss filter;

FIG. 8 shows a dynamically gain-flattened optical amplifier; and

FIG. 9 schematically illustrates an optical WDM communication system.

It is to be understood that these drawings are for purposes of illustrating the concepts of the invention and are not to scale.

DETAILED DESCRIPTION OF THE INVENTION

Figure 1A:
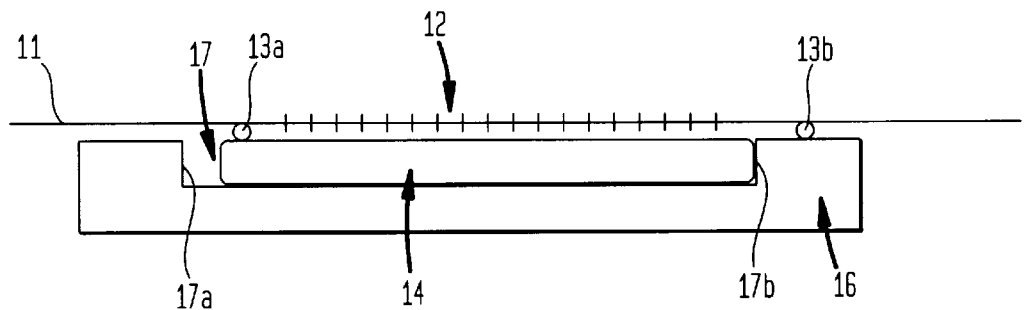
FIGS. 1A and 1B schematically illustrate one embodiment of an inventive bi-state tunable fiber grating device.
Figure 1B:
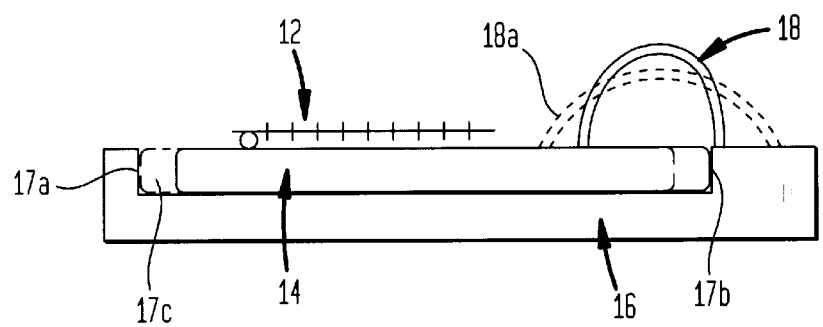

Referring to the drawings, FIGS. 1A and 1B schematically illustrate an exemplary tunable fiber grating device 10 comprising a length of waveguide, e.g., a length of optical fiber 11, which includes a grating region 12, and two structures 14, 16; one of the two structures (14) is movable and referred to herein as the body or movable body, and the other structure (16) is fixed and is referred to herein as the fixed substrate or the substrate 16. The grating region 12 may comprise grating elements of substantially equally-spaced index perturbations, slits, or grooves. Grating regions as are known in the field may be used, including Bragg gratings, long-period gratings, diffraction gratings, or chirped gratings. The body 14 is movable in a substantially longitudinal direction along the length of the fiber. Preferably, the body 14 is disposed adjacent the fiber at the grating region 12, as shown.

The fiber in the area of the grating region is attached at two points 13a, 13b, to the structures 14, 16; that is, at point 13a, the fiber is attached to the movable body 14, and at point 13b, the fiber is attached to the substrate 16. In FIGS. 1A–1B, the substrate also comprises a support frame for retaining the body 14. However, it should be understood the substrate and frame may comprise separate components. Various devices or substances may be used to secure the fiber at points 13a, 13b to the structures 14, 16. For example, mechanical attachments or bonds formed with epoxies or adhesives may be used. Preferably, the bond is sufficiently strong as to minimize strain relaxation at the bond interface. Non-thermoplastic or fusable glass adhesives may be used. Mechanical attachments such as with one or more screws or bolts for tightening may be used. Brazing or a solder with a relatively high melting point, high mechanical strength, and high creep resistance also are advantageous. With soldering, the fiber, body, or substrate may be coated on its surface at the attachment point with a metallization layer to improve the solder bond strength.

In FIG. 1A, the body is held within a cavity 17 of the support frame which in this embodiment is also the substrate 16. The cavity has two end walls 17a, 17b, which function as barriers against lateral movement of the body 14. In FIG. 1A, the ends walls of the frame supply a preset lateral dimensional constraint on the movement of the body such that the tensile strain on the fiber grating may have two distinct states. These states can be adjusted by changing the length of the cavity and the distance between the barriers 17a, 17b.

It is contemplated that the movement of the body can be induced in many ways, but preferred modes include use of magnetically-induced or mechanically-induced forces. When mechanical force is applied, the source of the force (not shown in FIG. 1A) may comprise one or more of a motor and gear system, a weight, a controlled explosive charge, a manual force, or the like, as are known. When a magnetically-induced force is used, a magnet may be attached to the body 14 and/or the frame 16, or these structures may be fabricated with magnetic material; a solenoid may then be provided around the magnets to generate a magnetic field when a current is passed into it, causing the induced magnetic moments to create attractive or repulsive forces, so that the body will move from a first to at least a second position. Magnetically-induced forces are also described in U.S. patent application Ser. No. 09/159,178, filed Aug. 23, 1998 filed contemporaneously herewith, by Jin et al., entitled, "*Tunable Dispersion Compensator and Optical System Comprising Same*," which is assigned to the present assignee and incorporated herein by reference. The invention is advantageous in that the precise amount of force applied to cause the movable body to shift or rotate positions is not critical. Instead, one may apply the force above a certain minimum value for a reliable switching operation to take place. When magnetically-induced force is used, the air gap between the facing poles advantageously may be closely controlled to optimize the accuracy of the wavelength shifts, e.g., by precision machining of the various components involved.

FIG. 1B schematically illustrates operation of one embodiment of the device. Here, a mechanically compressible (or stretchable) spring 18 is used to shift the movable body longitudinally along the length of the fiber. That is, the body is movable from a first position (e.g., as shown at the right of the figure) where the body 14 is in contact with one wall 17b of the cavity, to a second position (e.g., at the left of the figure), where the body 14 is in contact with the other wall 17a of the cavity (shown with dashed lines). The spring 18 is attached to the movable body 14 and to the frame or substrate 16, as shown. When the spring is stretched (as shown with dashed lines 18a), the body 14 moves within the cavity 17 from the first position to occupy the space 17c, and it hits the wall or barrier 17a and cannot move any further. This action applies a tension to the fiber grating and shifts the periodicity in the grating and the resonant wavelength by a fixed amount. The mechanical strain and wavelength shift thus produced may be made latchable by causing the spring to be mechanically latched, for example, the spring may be held with a spring latch (as is used, for example, in a ball point pen), or it may be magnetically latched using additional mechanical and magnetic components. When the spring is released, the movable body 14 returns to its original position, e.g., to the position shown making contact with wall 17b, thus reverting the wavelength to the original value. The latchability of the strain and shifted wavelength is an important advantage of the inventive device because once the movable body is set in a latched position, electrical power or the application of force is no longer needed. Thus, a continuous source of force is not required.

In FIGS. 1A–1B, there are only two fixed positions for the movable body. Thus, there are only two fixed states of tensile strain and hence, two grating wavelength states in the optical fiber grating 12. The distance the body 14 moves, which in FIG. 1B is the width of the gap 17c between the movable body and the left wall 17a of the frame, determines the degree of shift in the grating wavelength in this bi-state (digitally tunable) device. This distance is referred to herein as the "preset gap."

The force transmitted from the movable body to the grating produces strain which changes the wavelength response of the grating. When the fiber grating is stretched or compressed, the grating periodicity $\Lambda$ will also change. There may not be a one-to-one correspondence between the shift in periodicity and the wavelength change, although the wavelength response can be determined. For example, when the grating is stretched or compressed by 1% in length ($\epsilon=\Delta l/l=0.01$), the resonating Bragg reflection wavelength $\lambda$ will not change by exactly 1%, because the interatomic distance in the glass is affected by elastic strain which alters the refractive index n. This strain effect on the refractive index can be represented by a photoelastic constant $P_\epsilon$ which is typically about 0.22 for a $SiO_2$ fiber. The wavelength change induced by the applied strain $\epsilon$ ($\epsilon=\Delta l/l$) is thus expressed as $\Delta\lambda/\lambda=(\Delta l/l)(1-P_\epsilon)=\epsilon(1-P_\epsilon)$. The strain $\epsilon$ is determined by the applied stress ($\sigma$) and the elastic modulus (E), $\epsilon=\sigma/E$, and the stress on the fiber is the force (F) divided by the cross-sectional area ($\pi r^2$) where r is the radius of the fiber grating.

Since optical fiber tends to break at a tensile strain of less than about 6%, it is highly desirable to have a tunable grating design that automatically provides an upper limit in total tensile strain. The inventive tunable optical grating device offers such an advantage because the pre-set gap serves as an upper limit for tensile elongation of the fiber. The preferred width of the gap is typically less than about 4% of the fiber length being stretched (e.g., for a 2" long grating-containing fiber, the gap is preferably set below about ~80 mil), and more preferably, the gap is less than about 1% of the length of the grating-containing fiber. The digital tuning of the wavelength between two states achieved with this invention is particularly useful when an accurate wavelength shift is desired, without overshoot or undershoot, to prevent or minimize interference (e.g., cross-talk) with adjacent optical communication channels.

It is also important to avoid torsional deformation of the fiber. Torsion alters the amount of strain applied to the grating, reduces the fiber breaking strength for a given tensile strain, and may distort optical signals. For this purpose, advantageously at least a portion of the surface of the body 14 is essentially flat or smooth or contains a guiding mechanism. A guiding mechanism may comprise, for example, a lengthwise slot or groove on the surface of the body. A corresponding guiding rail or ridge can be placed in the cavity of the frame so that the body can move longitudinally within the frame but not in a crosswise or lateral direction relative to the fiber. It is desirable to have minimal friction between the moving parts, and thus preferably, a friction-reducing coating such as diamond-like-carbon, TEFLON™, or lubricating layer, may be applied to the all or part of the adjacent surfaces of the structures.

Figure 2:
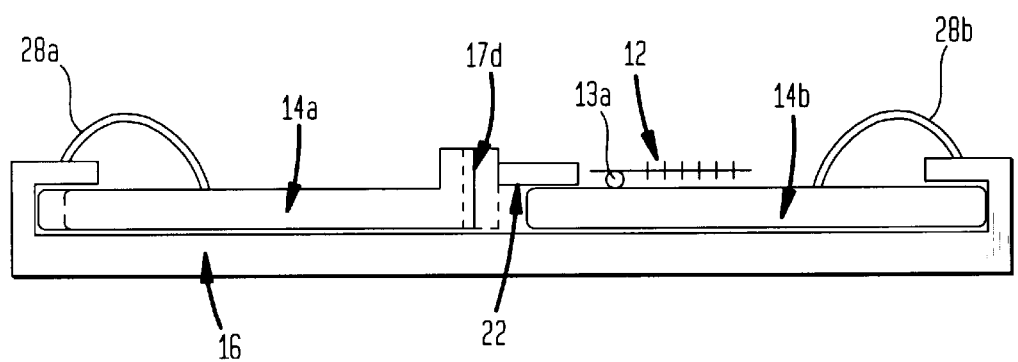
FIG. 2 schematically illustrates one embodiment of a tri-state tunable grating device.

As should be apparent, the present invention of tunable gratings is not limited to bi-state devices. Tri-state or higher order digital tuning is contemplated, for example, a tri-state tunable device is illustrated schematically in FIG. 2. Here, two separate latchable springs 28a, 28b, and two bodies 14a, 14b, are held within a single frame or substrate 16. One of the movable bodies 14a is used to adjust the size of the preset gap, i.e., the end of this movable body adjacent the second body 14b defines a lateral barrier or wall 17d, so that when the first body 14a moves, the location of the wall 17d moves, to adjust the size of the preset gap. Thus, this body is referred to herein as the "gap adjuster." The other, second movable body 14b is attached to and used to strain the grating 12, as with the body 14 of FIGS. 1A–1B. The first spring 28a is attached to the support frame at one end of the frame (e.g, shown in the figure on the left), and it is also attached to the gap adjuster 14a. The second spring 28b is attached to the frame at the other end of the frame (e.g., shown in the figure on the right), and to the second movable body 14b. The fiber (not fully shown) is attached to the second movable body 14b and the frame in the region of the grating 12, similarly as for FIG. 1B. In operation, the gap adjuster 14a can be configured to be latchably moved to at least two positions. When the gap adjuster is latchable in two positions, a tri-state device for wavelength shift is provided, that is, the second movable body 14b has two stable positions when positioned against the gap adjuster 14a (the left position in FIG. 2), and one stable position when positioned against the frame (the right position in FIG. 2). The latching spring 28a attached to the gap adjuster 14a should be sufficiently strong to resist counter-movement when the second body 14b is pressed against it. As an illustration, looking at FIG. 2, when the gap adjuster 14a is moved by the stretching of spring 28a to fill the space denoted by dashed lines, the gap adjuster 14a is not held in place by the frame 16 but is in a "free standing" position. When the second movable body 14b is then actuated to the left to contact the movable wall 17d defined by the gap adjuster, the wall 17d should remain in place. A support bar 22 can be used to hold the gap adjuster into the free-standing position, and this bar 22 also is helpful in counteracting the force of the spring so that the wall 17d does not move more than the desired distance toward the second movable body 14b. By repeating a similar structure and sequentially actuating a series of latchable springs, a higher order, digitally tunable device may be made.

With the inventive tunable grating, the grating region 12 of the device may comprise various gratings as are known, including a Bragg grating having a particular Bragg reflection wavelength for dropping or adding a wavelength component, or a long-period grating with a periodicity for certain peak wavelength of coupling. For example, for a median light beam wavelength of 1550 nm, the Bragg grating periodicity $\Lambda$ in a $SiO_2$ based fiber (with a refractive index n~1.45) may be about 500 nm. The length of each optical fiber grating of the grating assembly may be in the range of about 5 mm to 200 mm and preferably in the range of about 10–100 mm. For a short fiber grating, attachment points 13a, 13b may be beyond the grating region 12.

Figure 3:
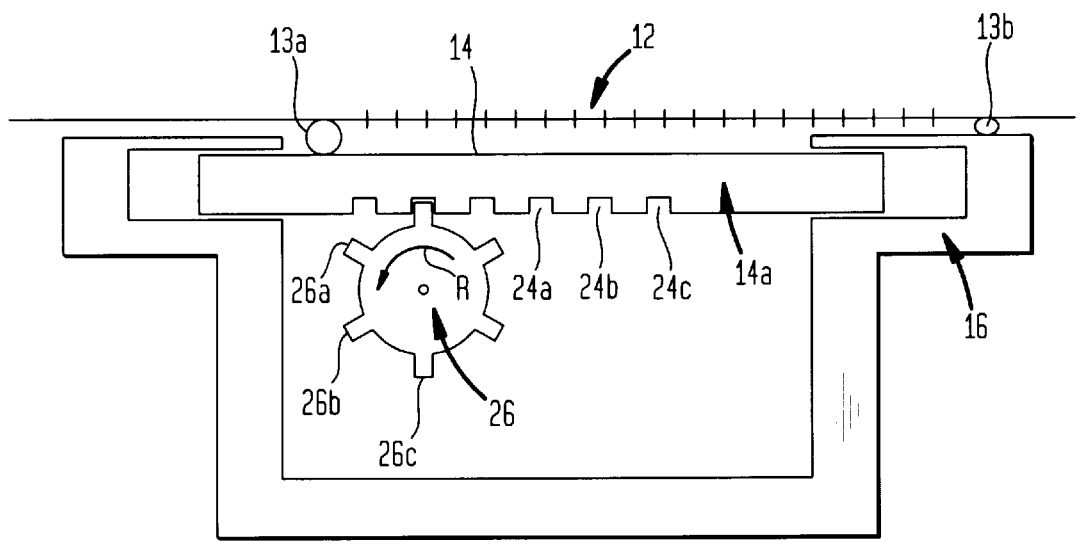
FIGS. 3 and 4 schematically illustrate alternative embodiments of inventive tunable grating devices.
Figure 4:
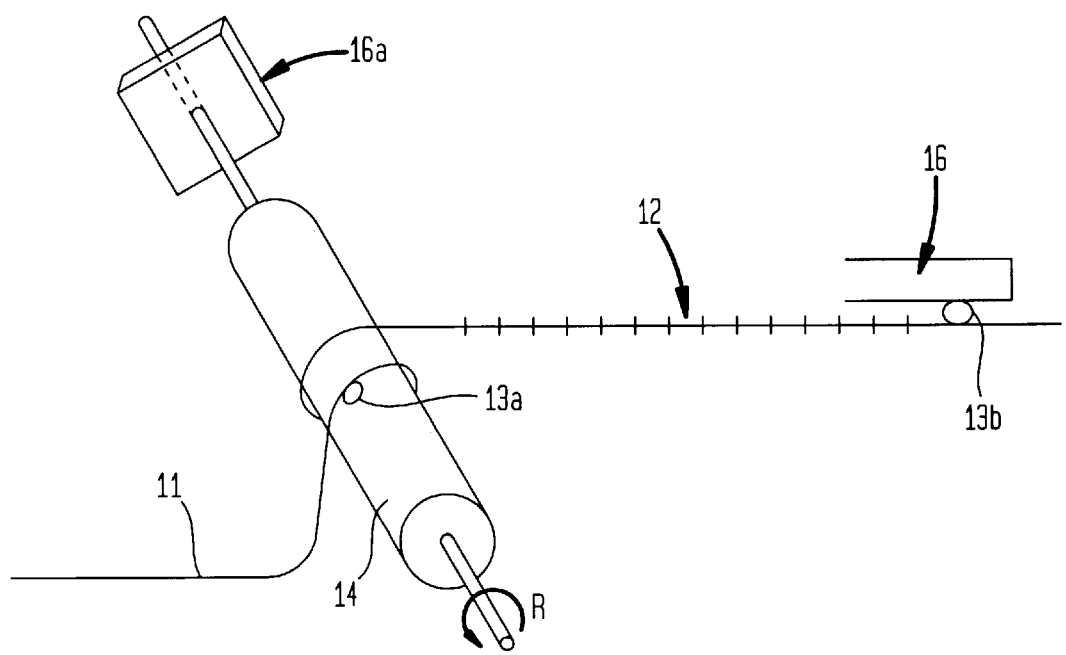

FIGS. 3 and 4 schematically illustrate alternative embodiments of the inventive tunable grating device. In FIG. 3, the movable body has a plurality of notches 24a, 224b, 24c on one of its surfaces, shown here as the bottom surface, which are dimensioned to correspond in size to teeth 26a, 26b, 26c, on a rotatable gear 26. The gear 26 in turn is controlled by an electrical motor (not shown), such as a stepper motor system. As should be apparent, as the gear 26 rotates, e.g., following arrow "R", a tooth situated in a notch pushes against the body and causes the body to move in a longitudinal direction along the side of the fiber grating 12, until that particular tooth is dislodged and a neighboring tooth becomes lodged in a neighboring notch on the body. In FIG. 4, the movable body 14 comprises a mandrel attached to a support frame 16b, and as the mandrel is rotated, e.g., following arrow "R", the fiber 11 is wound around it and can be latched to at a certain angle of rotation by an electrical motor system. Many systems as are known may be used to impart the latchability including a stepper motor system or a spring latch system.

Figure 5:
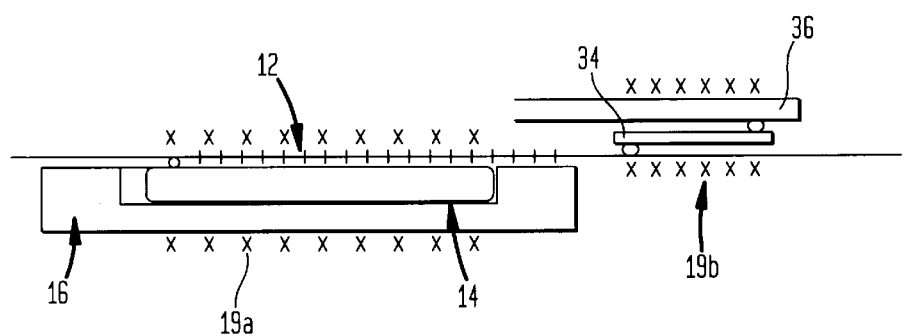
FIG. 5 is an exemplary tunable grating device with an adjustment assembly having magnetostrictive components for fine-controlling (tweaking) the base wavelength and desired wavelength shift.

After device assembly, use, or the passage of time, the device dimensions may change due to factors such as distortion, mishandling, temperature changes, or mechanical relaxation of some of the components or the bonding. These changes may cause an undesirable change in the wavelength response of the grating. Thus, one may wish to perform fine tweaking of the wavelength or the wavelength shift. FIG. 5 schematically illustrates an adjustment assembly which is an advantageous features that can be incorporated into the device structure for tweaking purpose.

In FIG. 5, at least one of the movable body 14 and the support frame 16 may be made of magnetostrictive material, which, upon magnetization and removal of the field (e.g., by using a solenoid), will have a remanent length change. This remanent change will correspond to a change in the base wavelength of the grating and the degree of the wavelength shift during device operation. Where the magnetostriction value is positive, the base wavelength can be corrected toward a higher value, and where the magnetostriction is negative, the wavelength can be corrected toward a lower value. If the magnetostrictive body is halfway magnetized initially, then the wavelength can be corrected toward both a lower or higher value. For example, a positive magnetostriction material that may be used comprises a Co-Fe alloy where the Co content is preferably at about 40 to 70 weight percent of the alloy. An exemplary negative magnetostrictive material is nickel. Other magnetostrictive materials such as Tb-Dy-Fe may be used. Alternatively, as also illustrated in FIG. 5, a separate magnetostrictive adjustment body 34 may be used in conjunction with a guiding tube 36 and solenoid 19b, for tweaking of the base wavelength. Other fine tweaking mechanisms such as adjustable screw systems may also be added to the frame or a guide tube component to alter the dimensions of the preset gap and carry out the fine tuning (tweaking).

The inventive tunable grating device has many advantages. The wavelength shift induced is latchable after the applied field is removed, and hence, a continuous power supply is not necessary to maintain the wavelength shift. The device structure is relatively simple. For optical communication networking, a multiplicity of the bi-state tunable and latchable gratings can be combined with circulators and other optical components to carry out wavelength-division-multiplexed fiber optic telecommunications. The inventive grating device is especially useful in wavelength division multiplexed communication systems which employ multiplexer/demultiplexer devices. In such systems, a "trunk" fiber carries optical signal channels at several wavelengths $\lambda_1, \lambda_2, \ldots \lambda_n$, and a single wavelength channel is extracted or "dropped" from the trunk fiber or added onto the trunk. A wide variety of such devices can be made by interconnecting optical circulators and fiber gratings. Typically, the channel reflected by the grating is dropped from or added to the trunk fiber. The inventive grating device permits selection of which channel is dropped or added.

Figure 6:
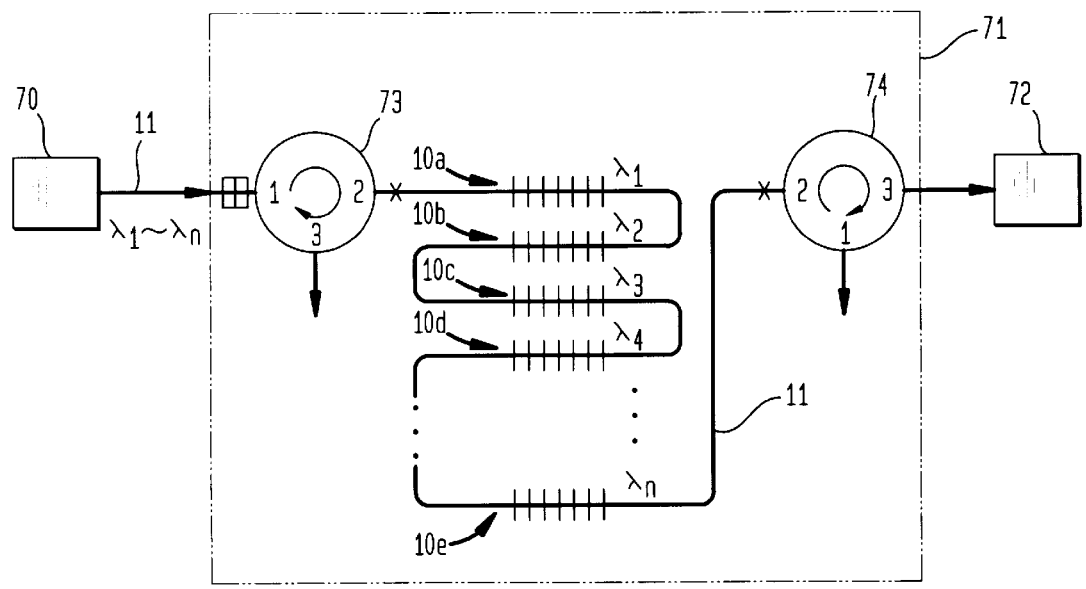

FIG. 6 schematically illustrates an example of a wavelength division multiplexed (WDM) communications system comprising a transmitter 70, an improved N-channel multiplexer/demultiplexer within boxed region 71, and a receiver 72, all connected by trunk fiber 11. The input to the fiber 11 from the source 70 consists of optical signals at several wavelengths, $\lambda_1$ to $\lambda_n$. The improved multiplexer 71 comprises one or more pairs (one pair is shown) of circulators 73, 74, comprising at least one upstream circulator 73 and a downstream circulator 74. A series of inventive bi-state (or multi-state) tunable gratings (10a, 10b, 10c, 10d, 10e), are placed between the circulators, with their grating wavelengths located at between-channel wavelengths. One or more of the optical grating devices 10a . . . 10e may be actuated for one-half channel shift in wavelength to drop or add adjacent communication channels, $\lambda_1$, $\lambda_2$, $\lambda_3$, $\lambda_4$, . . . to $\lambda_n$.

The following example represents a specific embodiment of the invention comprising a WDM system which is intended to be exemplary to aid in understanding the invention and not limiting in nature.

EXAMPLE

A 32-channel, switchable add/drop system for WDM comprises 32 tunable, bi-state fiber gratings connected in a series with associated circulators or directional couplers to serve as add or drop ports as schematically illustrated in FIG. 6. The nominal (mean) wavelength of the optical signal to be processed is about 1550 nm, and the signal wavelength channels are separated from one another by a spacing of about 0.8 nm producing a center-to-center spacing with a channel width of about 0.3 nm. The refractive index periodicity ($\Lambda$) of each grating is dimensioned so that all 32 gratings have their Bragg reflection wavelengths off by a half channel (placed at the mid-channel positions). Hence, without actuating the tuning, all 32 wavelength signals pass through the ADD/DROP system without being dropped. If a certain group of channels needs to be dropped, for example, channels #1, #5, and #27, the wavelength tunable devices for those gratings may be activated to strain the gratings by ½ channel, e.g., $\Delta\lambda/\lambda$ of roughly 0.4 nm/1550 nm≈0.025%. To cancel the DROP operation of a channel, e.g. channel #3, the strain is released to the original value to shift the wavelength back by ½ channel. The ADD operation is performed in a similar manner (e.g. for channels #4, #9, #14 and #23) but with a backward transmission through a circulator and Bragg reflection in the forward direction.

The inventive tunable grating assembly provides advantages for a variety of optical fiber communication devices and communication operation systems. For example, a chirped Bragg grating (e.g., with a gradient periodicity covering $\lambda_1$ through $\lambda_4$ along the length of one grating, or with four distinct grating structures written in series in one grating length) may be made switchable between two strain positions. In this case, four channels may be dropped or added simultaneously as a group. A plurality of chirped gratings may be connected so that the group-wise add/drop operation of channels can be performed covering a wider bandwidth. The tunable grating device also may be used to perform a dispersion compensating function to reduce chromatic dispersion of optical signals after a long distance of travel in the optical fiber network. When applied to the long-period gratings, the wavelength tunable device may be useful for gain adjustment of the amplified signals such as those amplified by erbium-doped fiber amplifiers.

Figure 7:
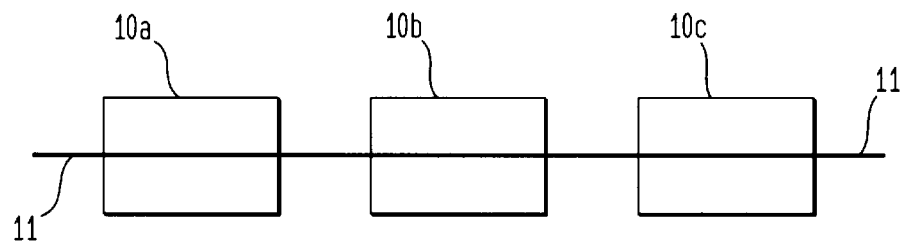

As schematically illustrated in FIG. 7, a tunable loss filter 80 covering a wider bandwidth than a single long-period grating device can be constructed by concatenating a plurality of tunable grating devices 10a, 10b, 10c, comprising long-period gratings along a single fiber 11. A desired loss spectrum can be obtained by selectively activating the gratings with a certain $\Delta\lambda$ shift capability.

Figure 8:
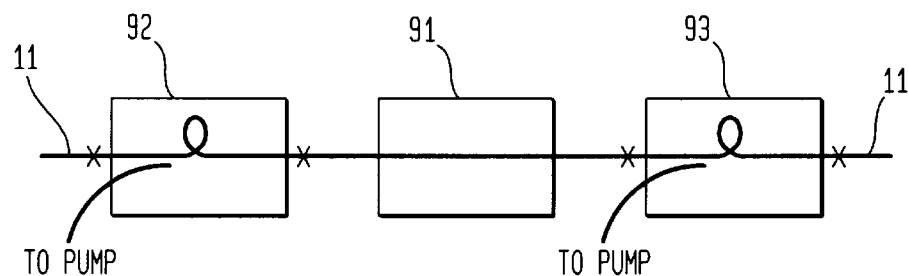

FIG. 8 illustrates a dynamically gain-flattened amplifier 90 made by including a tunable loss filter 91 composed of the tunable long-period gratings in a rare-earth doped amplifier (such as an erbium-doped fiber amplifier). The amplifier 90 preferably comprises a plurality of rare-earth fiber amplifier stages (e.g. two stages 92 and 93) connected by trunk fiber 11 and to the tunable loss filter 90. The filter 90 may be disposed at various locations relative to the amplifier stages 92, 93, as desired for a particular application. For example, the filter 90 may be disposed at the output of the first stage, as shown, which is preferred for providing the highest power and the lowest noise figure. For applications where noise is less important, however, the filter 90 may be placed in front of the first stage 92. For applications where power is less important, it may be placed at the output of the last stage 93. Long-period gratings for flattening the response of an amplifier are further described in U.S. Pat. No. 5,430,817 issued to A. M. Vengsarkar on Jul. 4, 1995, which is assigned to the present assignee and incorporated herein by reference. Such devices incorporating the inventive technology advantageously may be used in WDM optical communication systems to ensure equalized amplification under a wide variety of conditions.

Figure 9:
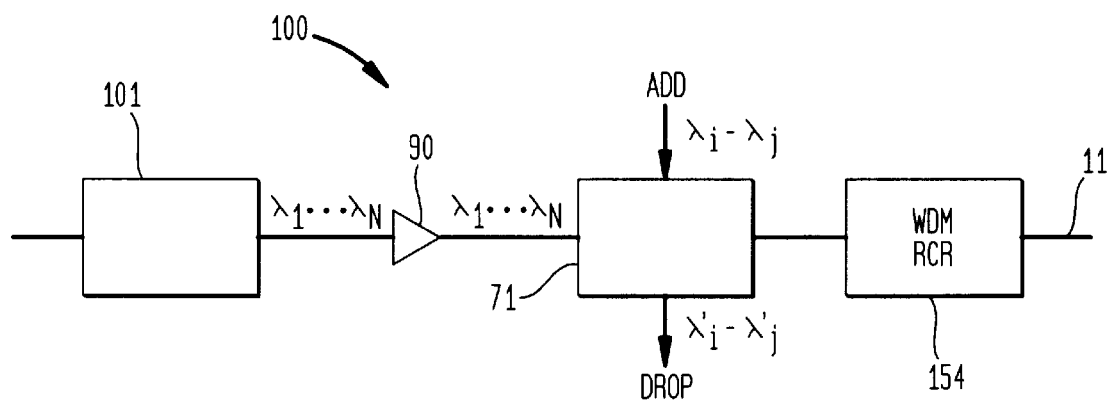

FIG. 9 schematically illustrates an optical WDM communication system 100 comprising a source 101 of modulated WDM optical signal channels $\lambda_1$, $\lambda_2$, . . . $\lambda_n$ along a trunk fiber 11. The channels pass through one or more gain equalized amplifiers 90, which may be gain-flattened amplifiers as shown in FIG. 9, and through one or more ADD/DROP devices 71, which may be ADD/DROP devices as shown in FIG. 6.

It is to be understood that the above-described embodiments are illustrative only, as there many possible embodiments which may represent applications of the invention. For example, the tunable grating device invention may be used for making various other types of non-fiber optical gratings for the purpose of reconfiguring or tuning the wavelength, amplitude, or phase of optical information. Use of the invention with slitted gratings, transmission-type or reflection-type grooved gratings, or phase gratings is contemplated for various optical applications such as for producing fresnel lenses, holographic images, and optical memory devices. Numerous and varied other arrangements can be made by those skilled in the art without departing from the spirit and scope of the invention defined by the appended claims.

We claim:

1. An article comprising a tunable optical grating device, the device comprising:

a length of waveguide including a grating region having a plurality of spaced-apart grating elements;

a body movable along the length of waveguide from a first position to at least a second position, the body being attached to the waveguide at a first attachment point; and a fixed substrate disposed adjacent the length of waveguide, the substrate being attached to the length of waveguide at a second attachment point;

wherein when the body is moved from the first position to at least the second position, the spacings between the grating elements are changed to shift the wavelength response of the device.

2. The article of claim 1 in which the movable body is latchably biased from the first position to the at least second position to define a latchably tunable device.

3. The article of claim 2, further comprising a spring attached to both the movable body and the fixed substrate for biasing the body between the first position and the at least second position.

4. The article of claim 1 in which the grating device has a switching capability between two strain states to define a bi-state tunable device.

5. The article of claim 1 in which the grating device has a switching capability between a plurality of strain states to define a multi-state tunable device.

6. The article of claim 1, in which the body comprises an elongated member having a predetermined length and two ends, and further comprising two spaced-apart lateral barriers, the distance between the barriers being greater than the length of the elongated member to define a preset gap and being so oriented such that, when one end of the body is in contact with one barrier the body is in the first position and when the other end of the body is in contact with the other barrier the body is in another position.

7. The article of claim 6, in which one of the lateral barriers is movable to vary the size of the preset gap.

8. The article of claim 6, further comprising a frame having an elongated cavity for retaining the body, the cavity having two end walls to define the two lateral barriers.

9. The article of claim 8, in which the frame and the fixed substrate are integrally formed.

10. The article of claim 6, in which the elongated member has on a surface thereof a plurality of notches for receiving one or more locking members to latch the member at preset locations.

11. The article of claim 1, in which the body comprises a mandrel so that when the body is moved from the first position to a second position the waveguide is wound around the mandrel.

12. The article of claim 1 in which the length of waveguide comprises a length of optical fiber.

13. The article according to claim 1 wherein the grating comprises a Bragg grating, a long-period grating, or a diffraction grating.

14. The article according to claim 1 further comprising an adjustment assembly for fine-tweaking the wavelength response of the device.

15. The article of claim 14 wherein the adjustment assembly comprises a magnetostrictive component having remanent and latchable change in length after an applied field is removed.

16. The article of claim 14, wherein the adjustment assembly comprises a mechanically adjustable screw or spacer assembly.

17. An optical multiplexer/demultiplexer comprising at least one tunable optical grating device according to claim 1.

18. An N-channel optical ADD/DROP multiplexer/demultiplexer comprising a plurality of optical circulators and a plurality of optical fiber gratings interconnected by an optical fiber, wherein at least one of the plurality of optical gratings comprises a tunable optical grating device according to claim 1.

19. A wavelength division multiplexed optical communications system comprising a source of multiple wavelength optical signal channels, an optical fiber trunk, and a multiplexer/demultiplexer, wherein the multiplexer/demultiplexer comprises tunable gratings according to claim 13.

20. A tunable loss filter comprising one or more long-period grating devices according to claim 13.

21. A dynamically gain-flattened optical amplifier comprising one or more long-period grating devices according to claim 13.

22. An optical amplifier comprising a plurality of rare-earth doped optical amplifier stages and a tunable loss filter comprising one or more long-period grating devices according to claim 13.

23. An optical communication system comprising a gain-flattened optical amplifier including one or more long-period grating devices according to claim 13.

24. The article according to claim 1 in which the grating region comprises at least one chirped optical grating.

25. An article comprising a tunable optical grating device, the device comprising:

a length of optical fiber including a grating region having a plurality of spaced-apart grating elements for transmitting light of a first wavelength;

a body movable along the length of fiber from a first position to at least a second position;

a source of force for moving the body from the first position to at least the second position; and a fixed substrate disposed adjacent the length of waveguide;

wherein the length of optical fiber is attached at one point proximal the grating region to the body and at another point proximal the grating region to the substrate so that when the body is moved from the first position to at least the second position, the spacings between the grating elements are changed to thereby shift the wavelength response of the device from the first wavelength to at least a second wavelength to provide a tunable optical grating device, the body being latchably biased between the first position and at least the second position so that the body may be held in either the first position or at least the second position without use of force, to define a grating device capable of tuned without continuously applying force.

* * * * *